Oct. 12, 1937.  P. E. CATE  2,095,355
APPARATUS FOR TESTING THERMOSTATIC DEVICES
Filed Aug. 27, 1935
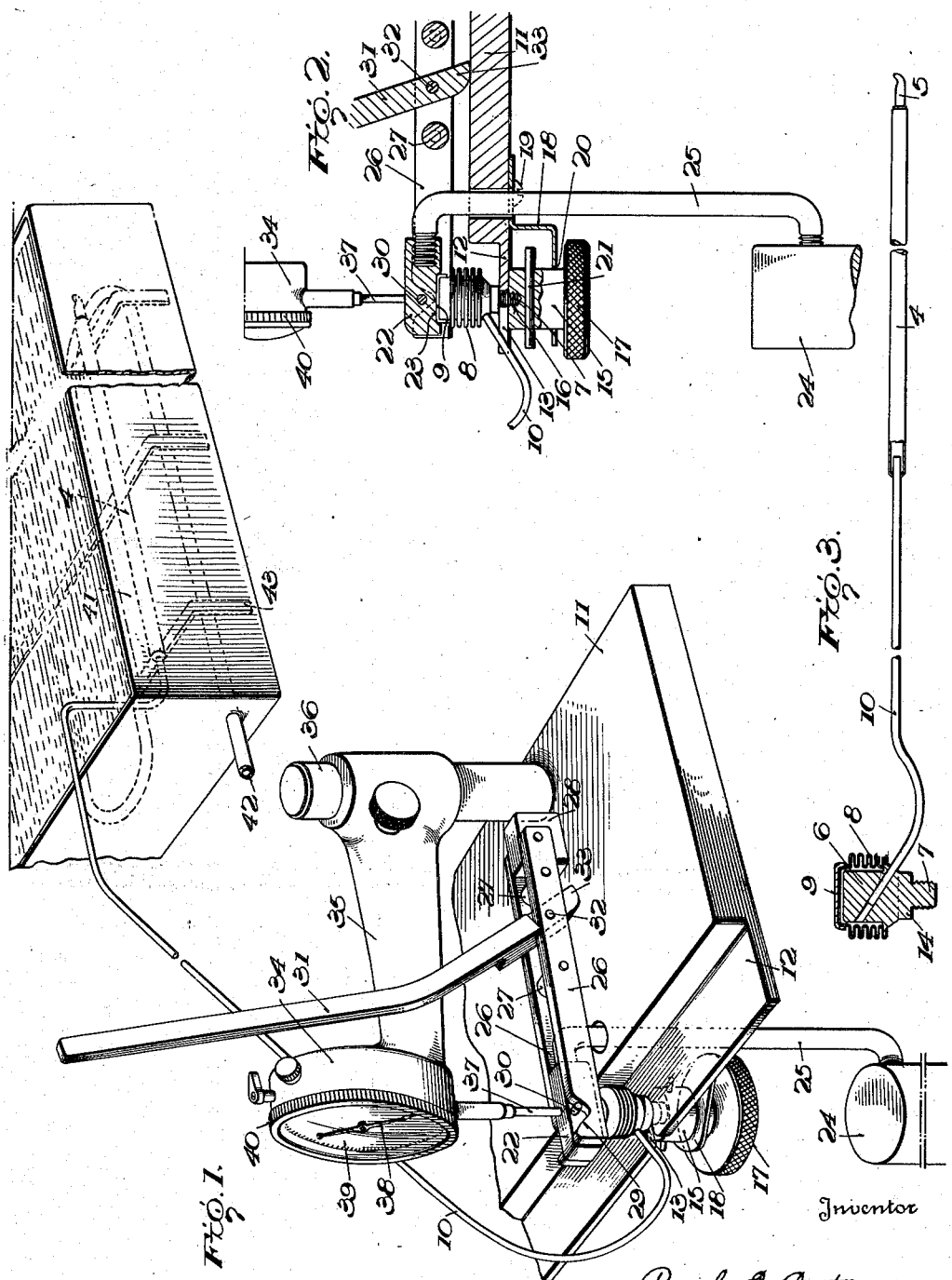
Inventor
Paul E. Cate
By Cameron, Kerkam + Sutton
Attorney Patented Oct. 12, 1937

2,095,355

UNITED STATES PATENT OFFICE 2,095,355

APPARATUS FOR TESTING THERMOSTATIC DEVICES

Paul E. Cate, Knoxville, Tenn., assignor to The Fulton Sylphon Company, Knoxville, Tenn., a corporation of Delaware Application August 27, 1935, Serial No. 38,131

13 Claims. (Cl. 73—51)

This invention relates to the manufacture of thermostatic devices, and more particularly to apparatus for testing thermostatic assemblies after they have been charged.

Although the invention is capable of embodiment in various forms for the testing of thermostats of specifically different constructions, it is particularly adapted for use with an assembly of the character illustrated in Fig. 3 of the accompanying drawing. As shown, such an assembly comprises an elongated thermostatic bulb intended to be subjected to the controlling temperature, an expansible bellows member one end of which is fixed to a threaded head and stop member while the other end is provided with a wall the movements of which are responsive to the variations in temperature at the bulb, and a capillary tube connecting the interiors of the bulb and bellows, the entire assembly being sealed and charged with a definite amount of thermo-responsive expansible liquid. The precision testing of assemblies of this type, particularly on a production basis, has heretofore presented a number of difficulties both because the testing temperature is relatively high and because the stroke of the movable end wall of the bellows member must be observed in movements as small as 1/1000 of an inch.

It is therefore one of the objects of the present invention to provide an apparatus of novel and relatively simple construction by the use of which thermostatic assemblies may be quickly and accurately tested on a production basis without encountering the difficulties previously experienced in work of this character.

Another object is to provide equipment of new and improved construction for testing thermostatic devices of the type described which will accurately indicate thermally produced movements as small as 1/1000 of an inch.

A further object is to provide precision testing apparatus of this character which, although of relatively simple and inexpensive construction, is nevertheless efficient and accurate in its operation and well adapted to the testing of thermostatic assemblies on a production basis.

Still another object is to provide a novel arrangement of testing equipment for checking the operation of thermostatic assemblies of the fluid expansion type which is so constructed that the assemblies may be quickly and easily mounted and demounted for the testing operation and when mounted held securely in proper relationship to an indicating device by means of which movements of the bellows member may be observed.

These and other objects will appear more fully upon a consideration of the detailed description of the embodiment of the invention which follows. Although only one form of testing apparatus embodying the invention is described and illustrated in the accompanying drawing, it is to be expressly understood that this drawing is for the purpose of illustration only and is not to be construed as defining the limits of the invention, reference being had for the latter purpose to the appended claims.

Referring now to the drawing, wherein like reference characters indicate like parts throughout the several views:

Fig. 1 is a perspective view of one form of testing equipment embodying the present invention;

Fig. 2 is a sectional view, with certain parts shown in full, of a portion of the testing equipment of Fig. 1; and Fig. 3 is a side elevation, with certain parts broken away, of one form of thermostatic assembly to the testing of which the apparatus of the present invention is particularly well adapted.

In describing the details of the construction and manner of operation of the equipment illustrated in Figs. 1 and 2, it will be assumed that the thermostatic assembly being tested is of the form illustrated in Fig. 3, although it will be understood that the apparatus of the invention, modified in certain structural respects, if necessary, is equally capable of testing thermostats of specifically different constructions than that shown. The assembly illustrated consists of a thermostatic bulb 4 adapted to be subjected to the controlling temperature, a crimped and welded bulb tip 5 of reduced diameter through which the assembly was charged, a combined bellows head and stop member 6 having a threaded boss 7 by means of which the bellows end of the assembly may be mounted in a fixed position, an expansible bellows member 8 connected at one end to head 6 but having an end wall 9 movable relatively to the combined head and stop member 6 in response to temperature variations at bulb 4, and a capillary tube 10 connecting the interior of bulb 4 with the space enclosed between the bellows 8 and head 6. The assembly just described is completely filled with any suitable thermo-responsive expansible liquid.

The apparatus of the present invention, by which assemblies of this type may be tested to determine whether the stroke of the bellows end wall 9 is properly responsive to the temperature variations to which bulb 4 is exposed, may comprise a plurality of like units, each adapted for the testing of one assembly, supported at suitable intervals along a common base 11. Inasmuch as all of the units are of the same construction, only one has been shown in the accompanying drawing, but it will be understood that the following description is applicable to all.

Base 11 is provided with an outwardly extending shelf or ledge 12 in which is formed an inwardly extending slot or recess 13 of a width slightly greater than the diameter of threaded boss 7 of the thermostatic assembly but less than that of the outside diameter of shoulder 14 which is formed in the plane of the junction of boss 7 and head 6. Directly beneath slot 13 is a locking or clamping member 15 the upper end of which is provided with an internally threaded recess 16 adapted for threaded engagement with the boss 7 of the thermostatic assembly, said member 15 also having a knurled head 17. When not threaded onto a boss 7, locking member 15 is maintained in readily assemblable position by means of a bracket 18 which is secured to the base 11 as by screws 19 and is provided with an opening 20 through which the body portion of locking member 15 is freely movable, the latter being prevented from falling downwardly through said opening by a suitable pin 21 which extends transversely through its body portion in a position above opening 20.

Mounted above slot 13 is a weight head 22 having in its under surface a counter bore 23 of suitable shape to receive and fit over the movable end wall 9 of the bellows. Weight head 22 is urged downwardly on top of the bellows by means of a weight 24 of any suitable size which may be positioned below the rest of the mechanism and connected to weight head 22 by a suitable connecting rod 25 passing through openings in both base 11 and bracket 18.

In order to support weight head 22 and its weight 24 when no thermostatic assembly is in mounted position, and to also raise and lower these elements out of and into engagement with the bellows as desired, the apparatus includes a pair of parallel arms 26 which are connected together in any suitable manner as by spacer members 27 and are pivotally mounted at their inner ends to a block 28 mounted on base 11. The outer ends of arms 26 are provided with suitable V-shaped notches or recesses 29 in the upper edges thereof which are adapted to receive the ends of a pin 30 which is carried by and extends transversely of weight head 22. Arms 26 are raised and lowered about their pivot on block 28 by means of a suitable lever 31 which is fulcrumed in arms 26 at 32 and has a cam-shaped lower end 33 in engagement with base 11.

In order to measure and indicate the movements of the end wall 9 of the bellows 8 during the testing operation, a dial gauge 34 is adjustably supported above weight head 22 in any suitable manner, as by a bracket arm 35 which may be adjustably clamped to a post 36 extending upwardly from base 11, the gauge 34 having a spindle 37 adapted to rest on top of weight head 22 and to transmit the movements of the latter through any suitable motion-multiplying transmission to an indicating hand 38. The dial 39 with which hand 38 registers is marked in any suitable way to indicate the movements of the hand corresponding to those of bellows end wall 9 and weight head 22 in amounts as small as 1/1000 of an inch. Dial 39 is so carried by or otherwise connected to an adjustable bezel 40 that the zero point thereof may be moved into registry with hand 38 at any position of the latter.

In order that the operation of the thermostatic assembly may be tested under controlled temperature conditions, the apparatus of the invention also includes a suitable heating tank 41 in which the thermostatic bulbs 4 of the assemblies being tested are adapted to be immersed in a heating bath of oil or other suitable liquid the temperature of which may be accurately controlled by any desired heating means such as a steam coil 42. Tank 41 is preferably provided with a plurality of supports 43 which maintain the thermostatic bulbs out of contact with the bottom of the tank and insure a practically uniform application of heat by the bath to the bulbs.

In testing thermostatic assemblies by the equipment thus described, the thermostatic bulbs 4 are first placed in a bath at some predetermined temperature and allowed to remain in the bath a sufficient length of time for the temperatures of all bulbs to become equalized. After equalization, the bellows end of each assembly is mounted in the testing equipment by raising weight head 22 by means of arms 26 and lever 31, sliding the threaded boss 7 of the bellows into slot 13, and then threading locking member 15 onto the bottom of said boss until the bellows is clamped tightly against the upper surface of ledge 12. Weight head 22 is then lowered by moving lever 31 to the left, as viewed in the drawing, until counterbore 23 comes into engagement with the movable end wall 9 of the bellows. Lever 31 is then allowed to move still further to the left sufficiently to completely disengage the lifting grooves 29 of arms 26 from pin 30 of weight head 22, thereby permitting the weight 24 to be applied through weight head 22 to the movable end wall of the bellows. When the parts come to rest in this position (corresponding to the showing of the drawing), the adjustable bezel 40 of gauge 34 is so set that the zero mark of dial 39 is in registry with the hand 38.

The thermostatic bulb 4 is then removed from the equalizing bath and placed in tank 41 in a suitable position on supports 43. The temperature of the bath in tank 41 is then raised by steam coil 42 in a desired controlled manner while the movements of end wall 9 of the thermostat are observed on gauge 34. Upon completion of the test, the thermostatic bulb 4 is removed from tank 41 and, after being wiped clean of oil or whatever other liquid is used in the heating bath, is tested for leaks, as by placing the bulb in a blue gas flame. Although any other suitable method may be used for testing for leaks, the gas flame test is particularly simple because the liquid with which the thermostatic assemblies are usually filled burns with a clear white flame, thus making a leak thereof readily detectable. The assembly is then removed from the testing equipment by raising weight head 22 out of engagement with the end wall 9 of bellows 8 and unscrewing locking member 15 from engagement with threaded boss 7.

There is thus provided by the present invention a novel and practicably useful equipment of relatively simple construction for testing thermostatic assemblies to determine whether or not the expansible elements thereof are properly responsive to temperature variations. The apparatus is so constructed that the thermostatic assemblies may be quickly mounted and demounted in testing position and, when mounted, securely held in proper relationship with a gauge which accurately indicates the movements of the members being tested, even though these movements may be as small as 1/1000 of an inch. The apparatus disclosed permits simultaneous testing of a plurality of assemblies, and, because of its simplicity in structure and manner of operation, is particularly well adapted for operation on a production basis.

It will be obvious that the invention is not limited to the apparatus shown in the drawing, but is capable of a variety of mechanical embodiments. For example, any suitable mechanism may be employed in place of the lever and arms illustrated for raising and lowering the weight head out of and into engagement with the bellows being tested, while it is equally apparent that the specific construction of the locking member which clamps the bellows assembly in testing position may be varied from that shown. Likewise it is obvious that any other suitable form of gauge may be substituted for that shown in the drawing, and that the equipment may be used for testing thermostatic assemblies of specifically different constructions from that shown. Various other changes, many of which will now become apparent to those skilled in the art, may be made in the form, details of construction and arrangement of the parts without departing from the spirit of the invention. Reference is therefore to be had to the appended claims for a definition of the limits of the invention.

What is claimed is:

1. In apparatus for testing a thermostatic assembly of the type including an expansible bellows having a normally fixed head and a movable end wall, the combination of means for mounting said assembly in testing position with the movable end wall of said bellows uppermost and the bellows head supported in a fixed position, means adapted to be freely depended from said movable end wall and out of contact with the other parts of the apparatus so as to apply only a vertically directed force in resisting upward movement thereof upon expansion of the bellows, means for effecting expansion of the bellows, and means for measuring the movements of said end wall caused by said expansion.

2. In apparatus for testing a thermostatic assembly of the type including an expansible bellows having a normally fixed head and a movable end wall, the combination of means for mounting said assembly in testing position with the movable end wall of said bellows uppermost and the bellows head supported in a fixed position, weighted means adapted to be freely suspended in dependent relation to said movable end wall and to resist upward movement thereof upon expansion of the bellows without application of lateral stress thereto, means for effecting expansion of the bellows, and a gauge for visually indicating the movements of said end wall caused by said expansion.

3. In apparatus for testing a thermostatic assembly of the type including an expansible bellows having a normally fixed head and a movable end wall, the combination of means for mounting said assembly in testing position with the movable end wall of said bellows uppermost and the bellows head supported in a fixed position, a weighted member adapted to be freely suspended on and to depend from the movable end wall in substantially vertical alignment therewith out of contact with the other parts of the apparatus, said weighted member adapted to resist upward movement of said movable end wall upon expansion of the bellows, means for effecting expansion of the bellows, and a gauge having an operating element in contact with said weighted member for visually indicating the movements of said end wall caused by said expansion.

4. In apparatus for testing a thermostatic assembly of the type including an expansible bellows having a normally fixed head and a movable end wall, the combination of means for mounting said assembly in testing position with the movable end wall of said bellows uppermost and the bellows head supported in a fixed position, a weighted member adapted to be suspended freely upon and to depend from the movable end wall and to resist upward movement thereof upon expansion of the bellows without imposition of lateral stress thereon, means for moving said weighted member into and out of engagement with the movable end wall, means for effecting expansion of said bellows, and means operatively associated with said weighted member for visually indicating the movements of said end wall caused by said expansion.

5. In apparatus for testing a thermostatic assembly of the type including an expansible bellows having a normally fixed head and a movable end wall, the combination of a base member, means for temporarily mounting said assembly in testing position on said base member with the movable end wall of the bellows uppermost and the bellows head secured to said base member, a weighted member adapted to engage the movable end wall and to resist upward movement thereof upon expansion of the bellows, means mounted on said base member for raising and lowering said weighted member into and out of engagement with said movable end wall, said last named means being releasable from said weighted member when the latter is resting on the bellows end wall, means for effecting expansion of said bellows, and a gauge for indicating the movements of said weighted member.

6. In apparatus for testing a thermostatic assembly of the type including an expansible bellows having a normally fixed head and a movable end wall, the combination of a base member, means for temporarily mounting said assembly in testing position on said base member with the movable end wall of the bellows uppermost and the bellows head secured to said base member, a weighted member adapted to engage the movable end wall and to resist upward movement thereof upon expansion of the bellows, means mounted on said base member for raising and lowering said weighted member into and out of engagement with said movable end wall, said last named means being releasable from said weighted member when the latter is resting on the bellows end wall, means for effecting expansion of said bellows, and a gauge for indicating the movements of said weighted member, said gauge including means for adjusting the indicator thereof to a zero reading after said weighted member has been placed in engagement with said movable end wall.

7. In apparatus for testing a thermostatic assembly of the type including an expansible bellows having a normally fixed head and a movable end wall, said head including a threaded boss of reduced diameter, the combination of a base member, means for temporarily mounting said assembly in testing position on said base member with the movable end wall of the bellows uppermost and the bellows head secured to said base member including an opening in the latter adapted to receive said threaded boss and a locking member adapted for threaded engagement therewith, a weighted member adapted to engage the movable end wall and to resist upward movement thereof upon expansion of said bellows, means mounted on said base member for lowering and raising said weighted member into and out of engagement with said movable end wall, means for effecting expansion of said bellows, and a gauge for indicating the movements of said weighted member.

8. In apparatus for testing a thermostatic assembly of the type including an expansible bellows having a normally fixed head and a movable end wall, the combination of a base member, means for temporarily mounting said assembly in testing position on said base member with the movable end wall of the bellows uppermost and the bellows head secured to said base member, a weighted member adapted to engage the movable end wall and to resist upward movement thereof upon expansion of said bellows, means including an arm pivotally mounted on said base member and a lever fulcrumed in said arm with one end in sliding contact with said base member for lowering and raising said weighted member into and out of engagement with said movable end wall, means for effecting expansion of said bellows, and a gauge for indicating the movements of said weighted member.

9. In apparatus for testing a thermostatic assembly including an expansible member the movements of which are responsive to variations in the temperature to which the assembly is subjected, the combination of means for mounting said expansible member with one end thereof in a fixed position, means for subjecting said assembly to a controllable temperature, a weighted member adapted to be freely suspended on and depended from the free end of said expansible member and out of contact with the other parts of said apparatus whereby said weighted member does not impose a lateral stress on said expansible member, and means for measuring the movements of said weighted member and free end of said expansible member caused by the variations in said controllable temperature.

10. In apparatus for testing a thermostatic assembly including an expansible member the movements of which are responsive to variations in the temperature to which the assembly is subjected, the combination of means for mounting said expansible member with one end thereof in a fixed position, means for subjecting said assembly to a controllable temperature, a weighted member adapted to be freely suspended on and depended from the free end of said expansible member, means for lowering and raising said weighted member into and out of engagement with said free end of the expansible member, and means for measuring the movements of said weighted member and free end caused by the variations in said controllable temperature.

11. In apparatus for testing a thermostatic assembly including an expansible member the movements of which are responsive to variations in the temperature to which the assembly is subjected, the combination of means for mounting said expansible member with one end thereof in a fixed position, means for subjecting said assembly to a controllable temperature, a weighted member adapted to rest on the free end of said expansible member, and a gauge pivotally mounted on a vertical axis to be swung into and out of operative association with said weighted member for measuring the movements of the free end of said expansible member caused by the variations in said controllable temperature.

12. In apparatus for testing a thermostatic assembly including a bulb and an expansible bellows the movements of which are responsive to variations in the temperature to which the bulb is subjected, the combination of means for mounting said bellows with one end thereof in a fixed position, means for subjecting said bulb to a controlled variable temperature, and means for indicating the movements of the free end of said bellows caused by the variations in said controlled temperature including a weighted member adapted to be suspended freely on said free end out of contact with the remainder of said apparatus whereby no lateral stress is imposed on said bellows and a movement registering gauge operatively associated with said weighted member.

13. In apparatus for testing a thermostatic assembly including a bulb and an expansible bellows having a normally fixed head and a movable end wall the movements of which are responsive to variations in the temperature to which the bulb is subjected, the combination of a base member, means for mounting said bellows on said base member with the head thereof in a fixed position, a weighted member adapted to be suspended freely on the movable end wall of said bellows and to oppose expansion of the latter, means for subjecting said bulb to a controlled variable temperature, means for moving said weighted member into and out of engagement with said movable end wall and for freeing said weighted member when in engagement with said movable end wall, and means for measuring the movements of the movable end wall of said bellows caused by the variations in temperature of said bulb including a gauge having an operating element in contact with said weighted member.

PAUL E. CATE.